May 29, 1928.
C. E. KOHLMANN
GAS VALVE LOCK
Filed March 23, 1927
1,671,594
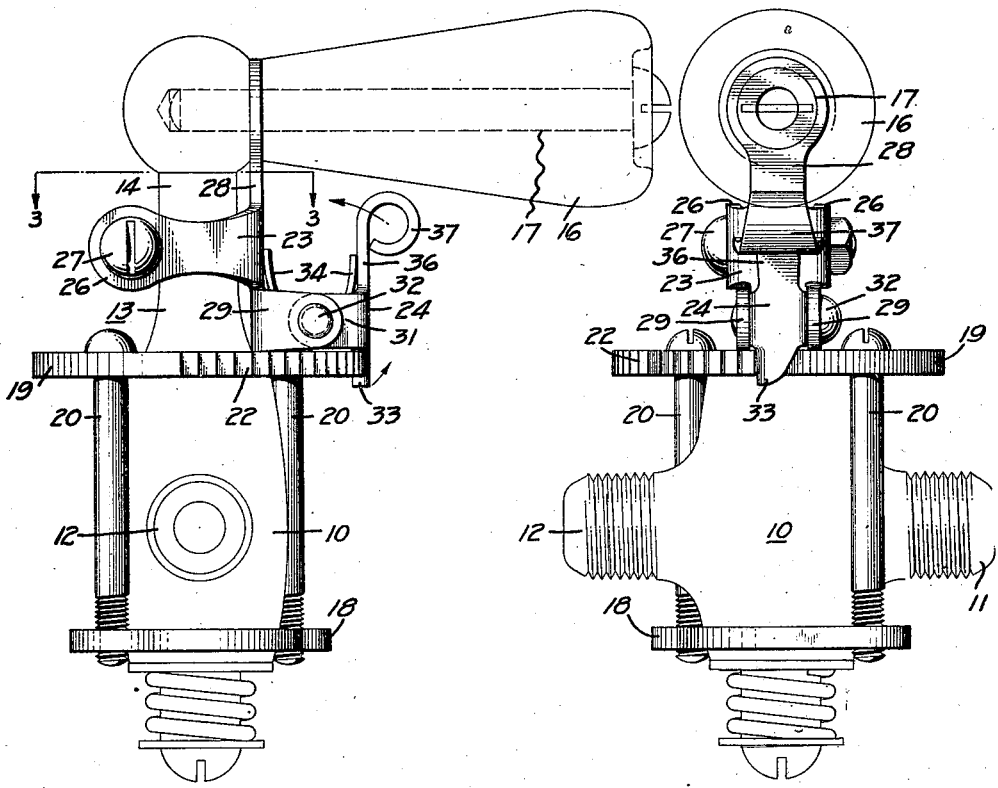
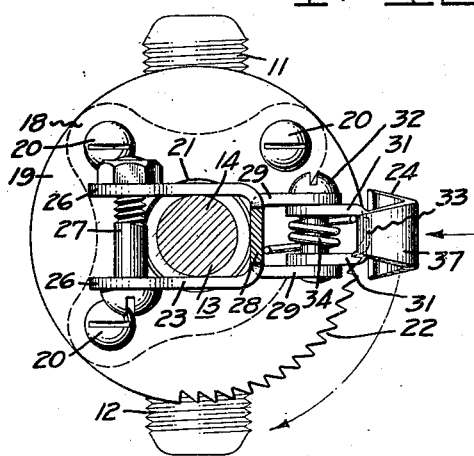
INVENTOR
Clarence E. Kohlmann
BY
White, Prost & Fryer
his ATTORNEYS Patented May 29, 1928.

1,671,594

UNITED STATES PATENT OFFICE.

CLARENCE E. KOHLMANN, OF SAN FRANCISCO, CALIFORNIA.

GAS-VALVE LOCK.

Application filed March 23, 1927. Serial No. 177,571.

This invention relates generally to devices for precluding the accidental opening of valves on gas ranges or other gas appliances.

Domestic gas ranges and heaters generally make use of gas valves of the petcock type, in which the handle which is attached to the rotatable valve plug need only to be turned thru an arc of 90 degrees between "off" and "on" positions. A valve of this kind is apt to be accidentally caught and turned on unless suitable locking mechanism is provided. Locking mechanisms of this kind have previously been proposed, but they have been complicated in construction and have not been universally applicable to all standard valves of the petcock type.

It is an object of this invention to devise mechanism for effecting locking of a gas valve, which will be simple in construction and cheap to manufacture.

It is a further object of this invention to generally improve upon construction of gas valve locking devices so that their operation is simplified and all possibility of accidental unlocking of the same is precluded.

Further objects of this invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view showing the device of this invention applied to a standard gas valve of the petcock type.

Fig. 2 is an end view of the device as shown in Fig. 1.

Fig. 3 is a cross sectional view taken along the line 3—3 of Fig. 1.

The invention comprises generally a toothed segment adapted to be fixed with respect to the body of a valve of the petcock type. Another member is adapted to be secured to the stem of the valve plug, and pivotally secured to this member there is a locking pawl adapted to engage the toothed segment. The locking pawl carries a portion manually operable to disengage the pawl. Instead of extending this portion longitudinally of the valve handle, it is extended in the general direction of the plug stem so as not to be in a position to be accidentally engaged. The member to which the locking pawl is pivotally secured, is attached to the valve stem by providing a portion which is clamped between the handle and the stem. Instead of having locking pawl engage the toothed segment to prevent rotation of the valve handle in either direction, the pawl when moved in one direction, ratchets over the teeth so that the valve may be moved to closed position without disengaging the locking mechanism.

Referring to the specific modification of the invention which has been illustrated, there is shown a standard valve of the petcock type which comprises a body member 10 provided with threaded portions 11 and 12 for making connections to the gas pipes. Valves of this type are provided with a rotatable plug 13 having ports which control passage of gas between the inlet and outlet pipes, this plug having an external stem 14 to which detachably is secured the laterally extending handle 16. Generally the handle is secured to the stem by means of screw 17 which is threaded into the stem head.

The locking device of this invention which is adapted to be attached to a valve of this kind comprises a pair of plates 18 and 19 which are adapted to be clamped to the top and bottom portions of body 10 as by means of a plurality of bolts or screws 20, these bolts for example being threaded into the lower plate 18.

In actual practice it has been found that three bolts are sufficient to securely retain the plates 18 and 19 upon the valve body, although two of the bolts should be spaced apart not more than 180 degrees. The upper plate 19 is provided with a central aperture 21 so as not to interfere with the operation of stem 14. The periphery of the upper plate is provided for a substantial portion thereof, with a toothed segment 22, the teeth of which are preferably inclined in one direction. Adapted to be detachably secured to the stem 14 there is a member 23 to which is pivotally secured a locking pawl 24.

A variety of expedients may be employed for securing the member 23 to stem 14 in order to prevent relative rotation between these members, although I prefer for simplicity to provide member 23 with a pair of lateral extending branches 26 which are adapted to be clamped upon opposite sides of the medial portion of a stem 14, as by means of a bolt 27. In addition to clamping member 23 to the medial portion of stem 14, this member is provided with an upwardly projecting portion 28 which extends between the inner end of handle 16 and the head of stem 14, and which is apertured to receive bolt 17. Bolt 17 therefore not only serves to retain the handle in place, but also serves to securely clamp portion 28 to the stem to prevent relative rotation between member 23 and the stem. For pivotally connecting the locking pawl 24 to member 23 there is shown a pair of lugs 29 formed integral with member 23 and which are adapted to be pivotally secured to a pair of complementary lugs 31 formed integral with locking pawl 24, the pivotal engagement being formed by a suitable pin 32. Pawl 24 may therefore rock about a pivotal axis substantially normal to the axis of rotation of the valve plug. The pawl is also provided with a projecting portion 33 which normally engages the toothed segment 22, and is biased to normally retain this locking engagement as by means of a spring 34.

For manually unlocking the device to permit opening of the valve, the locking pawl 24 is provided with an upwardly extending portion 36 which is adapted to be engaged by the finger of an operator and to be moved toward the stem 14 in order to rock the pawl to disengaged position. In order to facilitate engaging portion 36 with the finger, it may be provided with an upper rolled end 37. It will be noted that portion 36 extends in the general direction of stem 14 and does not extend outwardly along the under side of handle 16. This particular location of portion 36 is intended to prevent its accidental engagement with a garment with subsequent accidental unlocking of the valve, and also obviates obstructing the operator's grip upon the valve handle.

It will be readily appreciated that the device may be quickly attached to a standard valve of the type shown without the use of tools except an ordinary screw driver. The handle of the valve is removed for attaching the member 23, and plates 18 and 19 are positioned to bring the toothed segment 22 in correct position for the "on" and "off" positions of the valve handle before tightening the screws 20. In operating the device, when the handle 16 is gripped the first finger naturally engages the portion 36 to move the locking pawl 24 to disengaged position, thus permitting the valve to be moved to "on" position. In returning the valve to "off" position the pawl will ratchet upon the inclined teeth of segment 22 so that for this operation it is unnecessary to disengage the pawl 24.

I claim:

1. A device adapted to be detachably secured to a gas petcock, the petcock having a body, a plug rotatable in the body and having an external stem, and a laterally extending handle secured to the stem, said device comprising a toothed segment adapted to be detachably secured to the body, a member adapted to be detachably secured to the stem, said member having a portion adapted to be clamped between the handle and the stem, and a locking pawl pivotally secured to said member and adapted to normally engage the segment, said pawl having a manually engageable portion extending upwardly in the general direction of the stem.

2. A device adapted to be detachably secured to a gas petcock, the petcock having a body, a plug rotatable in the body and having an external stem, and a laterally extending handle secured to the stem, upper and lower plates adapted to be detachably clamped upon the body member, said upper plate having a toothed segment formed on its periphery, a member adapted to be secured to said stem, a locking pawl pivotally secured to said member to move about a horizontal axis, and spring means for normally urging said pawl into engagement with said segment, said pawl having a manually engageable portion extending upwardly and lateral to said handle, whereby when said portion is manually engaged and moved toward the stem, the pawl is released from the segment.

3. A device adapted to be detachably secured to a gas petcock, the petcock having a body, a plug rotatable in the body and having an external stem, and a laterally extending handle removably secured to the stem, upper and lower plates adapted to be detachably clamped upon the body member, said upper plate having a toothed segment formed on its periphery, a member adapted to be secured to said stem, said member having a portion thereof clamped between said handle and stem, a locking pawl pivotally secured to said member to move about a horizontal axis, and spring means for normally urging said pawl into engagement with said segment, said pawl having a manually engageable portion extending upwardly beneath said handle and substantially parallel to said stem, whereby when said portion is manually engaged and moved toward the stem, the pawl is released from the segment.

In testimony whereof, I have hereunto set my hand.

CLARENCE E. KOHLMANN.